Patented Oct. 25, 1932

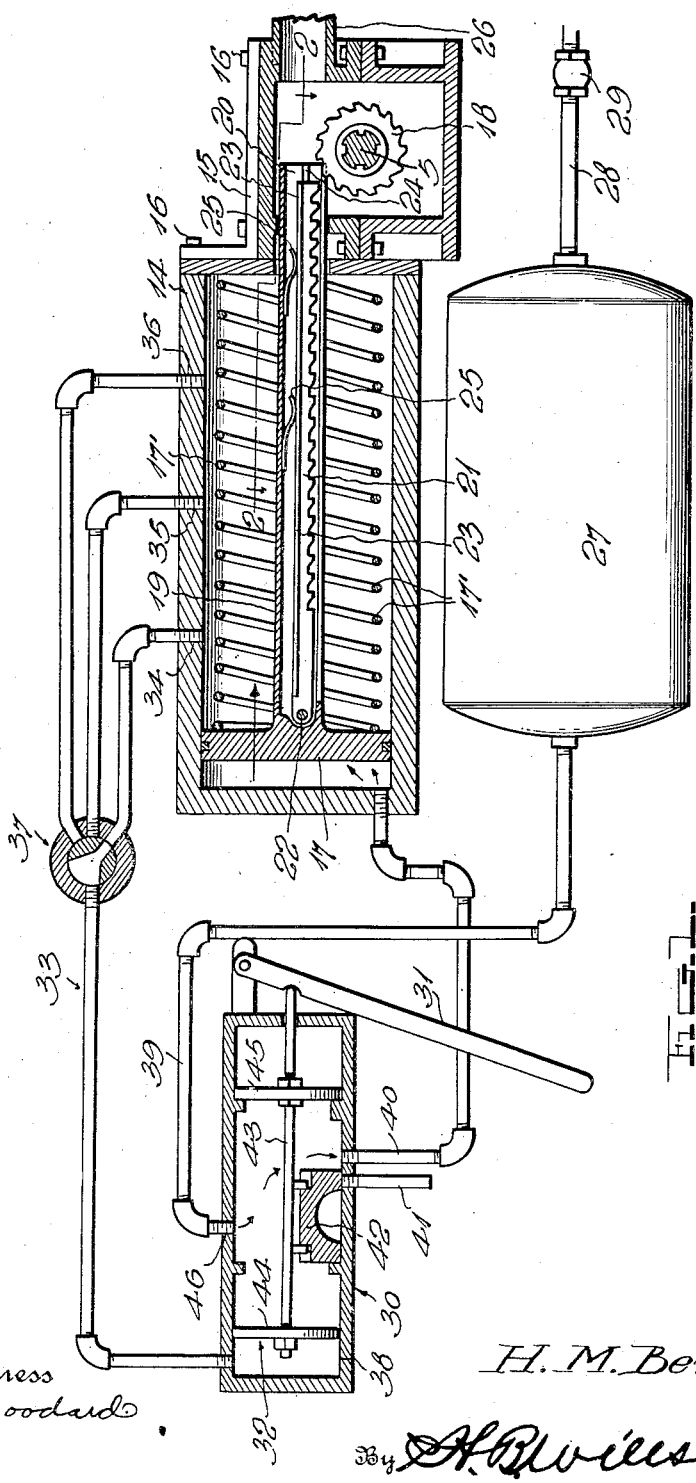

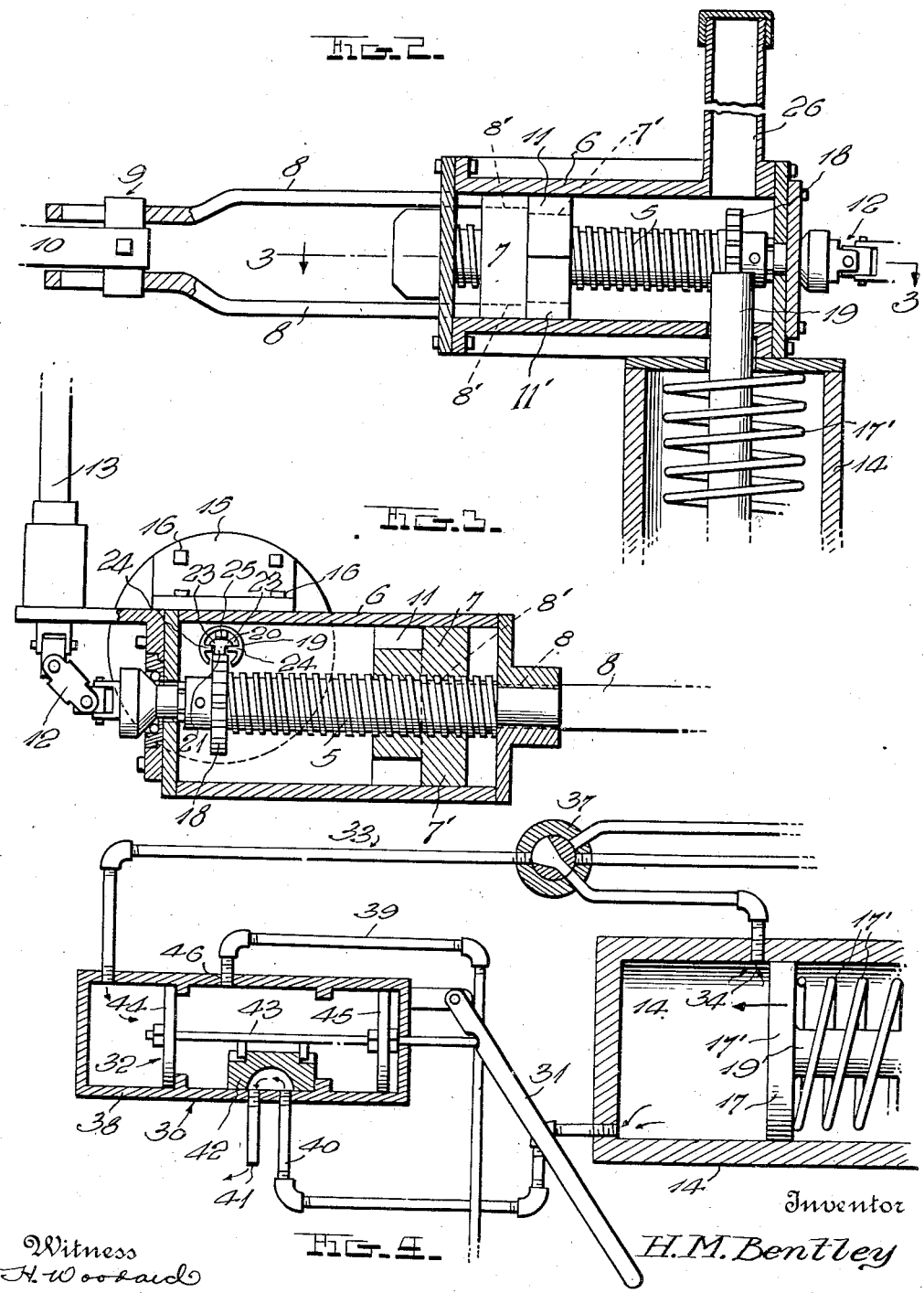

1,884,531

UNITED STATES PATENT OFFICE

HENRY MARION BENTLEY, OF SANTA RITA, NEW MEXICO, ASSIGNOR, BY MESNE ASSIGNMENTS, TO BENTLEY BRAKE CORPORATION, A CORPORATION OF NEW MEXICO

PNEUMATIC BRAKE ACTUATOR

Application filed April 25, 1931. Serial No. 532,951.

In my companion United States application Serial No. 532,950, filed April 25, 1931, I disclose a brake actuator for railway cars, said actuator embodying a hand-rotated screw to effect brake application proportionately with the amount which said screw is rotated in one direction, and it is the principal object of the present invention to provide novel and advantageous means for rotating said screw under the action of compressed air when desired.

A pressure-actuated piston is provided in a cylinder and one-way connecting means are employed between said piston and the screw for turning the latter to effect brake application when the piston advances, said one-way connecting means merely idling when the piston returns, and a further aim of the invention is to provide novel means whereby said piston may be automatically stopped when it has advanced to any predetermined position in the cylinder, thereby allowing brake application with any required degree of pressure.
Yet another aim is the provision of a brake mechanism which may be applied by air pressure but is held applied by non-pneumatic means which can be released only by hand, thereby overcoming possibility of the brakes releasing due to leakage of air after setting said brakes, for instance, when the car is on a siding or the like.

With the foregoing and minor objects in view, the invention resides in the novel subject matter hereinafter described and claimed, description being accomplished by reference to the accompanying drawings.

Fig. 1 is a sectional view partly in elevation showing the cylinder and piston, the brake-applying and releasing screw, the one-way connecting means between the piston and screw, and the means for controlling the admission of pressure to the cylinder and the exhaust of pressure therefrom, the control valve being set to cause the air pressure to move the piston from its normal position.

Fig. 2 is a fragmentary horizontal sectional view substantially on line 2—2 of Fig. 1, showing more particularly the means for connecting the brake-applying screw with the brake rigging of a car.

Fig. 3 is a vertical sectional view on line 3—3 of Fig. 2.

Fig. 4 is a view similar to Fig. 1 but showing parts set to allow return of the piston after its advance has been stopped at the predetermined point.

A preferred construction has been illustrated in the drawings and will be rather specifically described, with the understanding however, that within the scope of the invention as claimed, numerous variations may be made.

The numeral 5 denotes a brake-applying and releasing screw rotatable in a casing 6 and threaded through a nut 7 with which pull links 8 are connected. The outer ends of these links have a lost motion connection 9 with a pull rod 10 adapted for connection with an appropriate part of the brake rigging to apply the brakes when the links 8 are pulled and to release said brakes when said links 8 are allowed to move in the opposite direction. These parts 5 to 10 are used in connection with the conventional air brakes of a railway car, and the lost motion connection 9 allows operation of the brakes by air pressure, without intereference by the links 8 and associated parts. In case the brake mechanism must move excessively under the influence of the air, for instance, if one or more brake shoes have been lost, the links 8 may slide inwardly with respect to the nut 7, said links being slidably received in grooves 8' of said nut and having heads 11 lying against the inner end of the latter to pull the links when the nut is moved inwardly by the screw 5. The heads 11 slidably engage a hub 7' on the nut 7 and do not engage the screw 5. This screw is connected by universal joint means or the like 12 with a hand rotated shaft 13, whereby the screw may be rotated by hand to either apply or release the brakes.

All of the construction so far described is disclosed and claimed in the companion application above mentioned, and the present invention resides partly in pneumatic actuating means for the screw 5 and partly in the combination of this actuating means with portions of the above described structure.

A cylinder 14 is disposed at right angles to the casing 6 and is preferably secured thereto by a bracket 15 and fasteners 16. This cylinder contains an appropriate piston 17, and one-way connecting means are employed between said piston and the screw 5, for rotating the latter in brake-applying direction when the piston advances in the cylinder, said one-way connecting means merely idling upon return of the piston and hence leaving the screw 5 in the position to which it has been turned. In order to retrogradely rotate this screw to release the brakes, the hand-operated shaft 13 is utilized. Hence, while air pressure is employed to effect brake application, relieving the brakeman of unnecessary work, the brakes are held set by the co-acting threaded parts 5 and 7, independently of the action of the compressed air, so that even if all of the air should be exhausted due to leakage, the brakes cannot release until manually released by hand rotation of the screw 5.

While any appropriate one-way connecting means may be employed between the piston 17 and the screw 5, I prefer to use the particular means shown in the drawings. A ratchet wheel 18 is suitably secured to the screw 5 within the casing 6, and the piston rod 19 which is connected with the piston 17, is substantially tangential to said ratchet wheel, said rod being formed with a longitudinal channel 20 receiving a part of the wheel periphery. Disposed longitudinally in the channel 20, is a ratchet bar 21 whose teeth co-act with the teeth of the wheel 18 to rotate the screw 5 in brake-applying direction, when the piston 17 advances. In the present showing, the bar 21 is pivoted at 22 near the piston 17, is limited in its downward movement by co-acting longitudinal ribs 23 and 24, and is yieldably held lowered by appropriate springs 25. When the bar 21 is so held, it is in position to co-act with the wheel 18 as the piston 17 advances, but when said piston returns, the teeth of the bar 21 click idly over the teeth of the wheel 18 so that the latter remains in the position to which it has been turned. As the piston and its rod 20 advance, the latter is received in a tubular projection 26 with which the casing 6 is provided. Such advance of the piston and rod serve to compress a spring 17' in the cylinder, and when the air pressure is released from said cylinder, this spring returns the piston and rod to the normal position illustrated in Fig. 1.

An air reservoir 27 is provided connected by a pipe 28 with the usual compressed air line of the car, said pipe having a check valve 29 which prevents discharge of pressure from the tank 27 through said pipe 28, should the train line leak. Novel provision is made for controlling admission of air to the cylinder 14 from the tank or reservoir 27, for cutting off the admission of air to said cylinder, and for effecting exhaust of air, so as to properly control the piston 17. A control valve indicated as a whole by the reference number 30, is employed, said valve having manually-actuated means 31 for setting it to admit pressure to the cylinder 14 and having pressure-actuated means 32 for setting it at a position to cut off admission of air to the cylinder and to effect exhaust of air from the latter. Air-conducting means 33 is provided to conduct air from the cylinder 14 to the pressure-actuated means 32 for the purpose of setting the valve 30 to discontinue supply of pressure to the cylinder and effect exhaust of pressure from the latter, when the piston 17 has reached any one of a plurality of predetermined points in said cylinder. This means 33 embodies three inlets 34, 35 and 36 which are controlled by the piston 17; and valve means 37, set by hand, is employed to allow travel of pressure from the cylinder 14 to the means 32, from any one of said inlets 34, 35 and 36. With the valve 37 set as seen in Fig. 1 and the valve 30 set by the manually-actuated means 31, in the position shown in this view, air pressure is admitted to the cylinder 14 to advance the piston 17 and effect rotation of the screw 5. As soon as the piston 17 uncovers the inlet 34, the air pressure from the cylinder passes through the conducting means 33 to the pressure-actuated means 32, thereby setting the valve 30 at the position shown in Fig. 4, whereupon pressure from the cylinder 14 immediately exhausts and the spring 17' returns the piston 17, rod 19, etc. Movement of the piston 17 until it uncovers the inlet 14 and return of said piston after uncovering said inlet, obviously turns the screw 5 only a relatively small amount to apply the brakes with little pressure. If the valve 37 be set, so that the admission of pressure to the cylinder 14 will not be stopped until the inlet 35 is uncovered by the piston 17, the screw 5 will be further rotated and hence the brakes will be further applied, and for a maximum application of the brakes, the valve 37 is set so that pressure cannot escape from the cylinder 14 until the piston 17 has uncovered the third inlet 36.

In the present disclosure, the valve 30 embodies a casing 38 to the upper portion of which a pipe 39 leads from the reservoir or tank 27. The lower portion of this casing is connected with a pressure-conducting pipe 40 leading to the cylinder 14, and near said pipe 40, is provided with an exhaust pipe 41. A slide valve 42 is mounted in the casing 38 and when positioned as seen in Fig. 1, allows passage of air from the pipe 39 through the casing 38 and through the pipe 40, to the cylinder 14. When the valve 42 however, is shifted to the position seen in Fig. 4, it places the pipe 40 in communication with the exhaust pipe 41, so that exhaust of air may take place from the cylinder 14.

The valve 42 is connected with a piston rod 43 which extends through one end of the casing 38, said rod having pistons 44 and 45 at opposite sides of the point 46 at which air pressure is admitted to the casing 38. The construction and relation of parts is such that the pressures acting oppositely against the pistons 44 and 45 are balanced and the valve 42 will therefore remain in the position shown in Fig. 1, until an overbalance of pressure is effected by passage of air through the conducting means 33, whereupon the valve 42 will shift to the position shown in Fig. 4. It may here be explained that the piston 44 constitutes part of the pressure-actuated means 32 above described, for setting the valve 30 in position to discontinue admission of pressure to the cylinder 14 and to effect exhaust of pressure from said cylinder.

All parts except 31, 43, 44, 45 and 42 remain normally as seen in Fig. 1, but the normal position of said parts 31, 43, 44, 45 and 42, is seen in Fig. 4. When the brakes are to be applied, the means 31 which may be of any desired character and may contact with the rod 43 as shown, is operated to effect movement of the valve 42 to the position shown in Fig. 1. Air from the reservoir 27 then passes through the pipe 39, casing 38 and pipe 40 into the cylinder 14, advancing the piston 17. When one or another of the inlets 34, 35 and 36 is uncovered (according to the setting of the valve 37), pressure from the cylinder 14 flows through the conducting means 33 and acts upon the piston 44 to shift the valve 42 to the position shown in Fig. 4. Hence, supply of pressure to the cylinder 14 is cut off and the pipe 40 is placed in communication with the exhaust pipe 41, so that the spring 27 may then act to immediately return the piston 17 and connected parts. It will be recalled that advance of the piston effects rotation of the screw 5 to apply the brakes and that return of said piston leaves said screw in the position to which it has been rotated. The amount of rotation imparted to the screw and consequently the pressure with which the brakes are applied, is controlled by the extent which the piston 17 is allowed to travel, and such extent of travel is dictated by the setting of the valve 37 as above explained. When this valve is set as seen in Fig. 1, as soon as the piston 17 passes the inlet 34, the control valve 30 trips to cut off pressure-admission to the cylinder and to effect pressure-exhaust therefrom, as seen in Fig. 4, whereas greater travel of the piston 17 and greater rotation of the screw 5 is effected by setting said valve 37 so as to trap air in the cylinder 14 until the inlet 35 or the inlet 36 is uncovered by the piston.

In order to release the brakes, it is necessary to retrogradely rotate the screw 5 by hand. Hence, even if air pressure should be lost due to leakage, the brakes cannot become released with danger of allowing the car to disastrously drift.

I claim:—

1. In a brake-actuating mechanism, pneumatic brake applying means embodying relatively stationary and rotatable inter-engaged threaded members, the rotatable member of which is instrumental both in moving the relatively fixed member in brake-applying position and in holding it in said position, and manually actuated means for rotating said rotatable member in a direction to release said holding means and effect brake release.

2. In a brake-actuating mechanism, co-operable screw-threaded members for effecting brake application when one of said members is rotated in one direction, for holding the brakes set when rotation in said one direction is stopped, and for effecting brake release when said member is retrogradely rotated; pneumatic means having a one-way operating connection with said one member for rotating it only in said one direction, and means independent of said pneumatic means for retrogradely rotating said one member to effect brake release.

3. In a brake-actuating mechanism, the combination of a rotatable member for applying brakes proportionately with the amount of rotation imparted to said member, a pressure-actuated piston, one-way connecting means between said piston and said rotatable member for rotating the latter only during advance of said piston, and manually settable means for effecting stopping of said piston at any one of a plurality of different positions, allowing rotation of said rotatable member to the required extent.

4. In a brake-actuating mechanism, the combination of a rotatable member for applying brakes proportionately with the amount of rotation imparted to said member, a piston and a cylinder therefor, one-way connecting means between said piston and said rotatable member for rotating the latter only during advance of said piston, and pressure admission and exhaust means for the cylinder embodying manually settable means for automatically cutting off pressure admission and effecting pressure exhaust when the piston has advanced to any of a plurality of predetermined positions in the cylinder, allowing rotation of said rotatable member to the required extent.

5. In a brake-actuating mechanism, the combination of a rotatable member for applying brakes proportionately with the amount of rotation imparted to said member, a piston and a cylinder therefor, one-way connecting means between said piston and said rotatable member for rotating the latter only during advance of said piston, a valve for controlling admission of pressure to and exhaust of pressure from said cylinder, said valve having hand-actuated means for setting it at pressure-admitting position and pressure-actuated means for setting it at pressure-cut-off and exhaust position, pressure-conducting means leading to said pressure-actuated means and having inlets controlled by said piston and spaced apart along said cylinder, and manually set valve means for allowing passage of pressure through said conducting means from any of said inlets.

6. In an actuating mechanism, a piston, a cylinder therefor, and pressure-admitting and exhaust means for said cylinder, embodying manually settable means for automatically cutting off pressure admission to and simultaneously effecting pressure exhaust from said cylinder when the piston has advanced to any of a plurality of predetermined positions in the cylinder.

7. In an actuating mechanism, a piston, a cylinder therefor, a valve for controlling admission of pressure to and exhaust of pressure from said cylinder, said valve having hand-actuated means for setting it at pressure-admitting position and pressure-actuated means for setting it at pressure cut-off and exhaust position, pressure-conducting means leading to said pressure-actuated means and having inlets controlled by said piston and spaced apart along said cylinder, and manually set valve means for allowing passage of pressure through said conducting means from any of said inlets.

8. In an actuating mechanism, a rotatably mounted work-performing ratchet wheel, a rod substantially tangential to said ratchet wheel and having a longitudinal channel receiving a peripheral portion of said wheel, a ratchet bar carried by said rod and disposed longitudinally in said channel for co-action with said ratchet wheel when said rod is moved in one direction, means yieldably mounting said ratchet bar for lateral shifting in said channel away from said wheel when said rod is moved in the reverse direction, guiding means for said rod, and means for moving said rod in said directions.

In testimony whereof I affix my signature.

HENRY MARION BENTLEY.

CERTIFICATE OF CORRECTION.

Patent No. 1,884,531.  October 25, 1932.

HENRY MARION BENTLEY.

It is hereby certified that the name of the assignee by mesne assignments in the above numbered patent was erroneously described and specified as "Bentley Brake Corporation, a corporation of New Mexico", whereas said name should have been described and specified as "Bentley Brake Corporation-No Stockholders' Liability, a corporation of New Mexico", as shown by the records of assignments in this office; and that the said Letters Patent should be read with this correction therein that the same may conform to the record of the case in the Patent Office.

Signed and sealed this 27th day of December A. D. 1932.

(Seal)

M. J. Moore,
Acting Commissioner of Patents.